(12) United States Patent
Maciejczyk

(10) Patent No.: US 11,390,194 B2
(45) Date of Patent: Jul. 19, 2022

(54) IMPACT ENERGY ABSORBING DEVICE

(71) Applicant: Britax Childcare Pty Ltd, Sunshine (AU)

(72) Inventor: Wieslaw Maciejczyk, Sunshine (AU)

(73) Assignee: BRITAX CHILDCARE PTY LTD., Sunshine (AU)

( * ) Notice: Subject to any disclaimer, the term of this patent is extended or adjusted under 35 U.S.C. 154(b) by 0 days.

(21) Appl. No.: 17/231,846

(22) Filed: Apr. 15, 2021

(65) Prior Publication Data

US 2021/0229579 A1 Jul. 29, 2021

Related U.S. Application Data

(63) Continuation of application No. 15/851,862, filed on Dec. 22, 2017, now Pat. No. 10,988,057.

(30) Foreign Application Priority Data

Dec. 23, 2016 (AU) .............................. 2016905370

(51) Int. Cl.
*B60N 2/28* (2006.01)
(52) U.S. Cl.
CPC .......... *B60N 2/2884* (2013.01); *B60N 2/2872* (2013.01)
(58) Field of Classification Search
CPC ...... B60N 2/2872; B60N 2/2884; B60N 2/26; B60N 2/30
USPC ................ 297/216.11, 216.12; 5/655.3, 655
See application file for complete search history.

(56) References Cited

U.S. PATENT DOCUMENTS

| | | | | |
|---|---|---|---|---|
| 3,171,691 A | * | 3/1965 | Buehrig | A47C 7/425 297/452.54 |
| 3,280,410 A | * | 10/1966 | Propst | A47C 4/54 267/119 |
| 3,441,310 A | * | 4/1969 | Gale | A47C 5/12 297/294 |
| 4,934,004 A | * | 6/1990 | Friedman | B60N 2/2854 5/118 |

(Continued)

FOREIGN PATENT DOCUMENTS

CN 112428895 A * 3/2021 ........... B60N 2/2851

*Primary Examiner* — Milton Nelson, Jr.
(74) *Attorney, Agent, or Firm* — K&L Gates LLP

(57) ABSTRACT

A child safety seat comprising a seat body and first and second side wings depending from the seat body, the first and second side wings each comprising an outwardly facing exterior surface, an impact energy absorbing device depending from at least a part of the exterior surface of the first and second side wings, the impact energy absorbing device comprising a hollow and/or gas, liquid, gel or other energy absorbing material filled shell of deformable material formed by blow moulding, comprising an outwardly facing surface and an inwardly or occupant facing surface, and a plurality of energy absorbing elements in the form of recesses extending into the shell from the inwardly facing surface toward the outwardly facing surface: wherein the impact absorbing system is adapted to absorb impact through a combination of the shell plastically or elastically deforming, cushioning, rupturing, deflating or bursting, and the plurality of energy absorbing elements cooperatively plastically or elastically deforming, cushioning or crushing, as a result of the impact.

20 Claims, 6 Drawing Sheets

(56) References Cited

U.S. PATENT DOCUMENTS

| | | | | |
|---|---|---|---|---|
| 5,195,199 A * | 3/1993 | Sereboff | ............... | A47C 7/021 |
| | | | | 5/654 |
| 2004/0164529 A1* | 8/2004 | Yoshida | ............... | B60N 2/2884 |
| | | | | 280/730.2 |
| 2013/0062917 A1* | 3/2013 | Powell | ................ | B60N 2/2872 |
| | | | | 297/216.11 |
| 2015/0091344 A1* | 4/2015 | Tanner | ............... | B60N 2/42709 |
| | | | | 297/216.11 |

* cited by examiner

IMPACT ENERGY ABSORBING DEVICE

The present application is a continuation of U.S. application Ser. No. 15/851,862, filed Dec. 22, 2017, now U.S. Pat. No. 10,988,057, which claims priority to Australian Patent Application No. 2016905370, filed Dec. 23, 2016. The entire contents of each are incorporated herein by reference and relied upon.

TECHNICAL FIELD

The present invention relates to an impact energy dissipating device. In a particular form the present invention relates to an impact energy dissipating device for attachment to any one of or more externally directed portions of a child restraint for a vehicle.

INCORPORATION BY REFERENCE

The following publications are referred to in the present application and their contents are hereby incorporated by reference in their entirety:

International Patent Application No. PCT/AU2010/001495 (WO/2011/054063) titled "CHILD SEAT WITH IMPACT PROTECTION" in the name of Britax Childcare Pty Ltd.

BACKGROUND

In any vehicular crash, a major source of injury to the occupant is contact with any intruding objects such as the vehicle door interior, or projectiles such as glass or metal shards. When a vehicle is hit from the front or rear, risk from intruding objects is minimised and the front or rear of the vehicle and vehicle frame create a large crumple zone between intruding objects and the occupant. When a vehicle is hit from the side however, this crumple zone is minimal, consequently posing the most frequent and severe threat to occupant safety.

Child safety seats, also known as child restraints, are used to provide additional protection to an occupant in the event of a vehicular crash, and generally comprise a rigid seat body comprising a base portion, a back portion, a headrest and side wing portions. While the rigid side wing portions provide a means of protecting the child in the event of a side impact crash from projectiles such as glass or metal shards, their rigidity means that the majority of the impact energy from the side impact crash transfers to the occupant of the seat.

Attempts to reduce the impact energy transferred to the occupant have been made by applying impact absorbing mechanisms to child seats, such as the solutions described in International Patent Application No. PCT/AU2010/001495. FIGS. 10A and 10B show a schematic of an existing solution including a side impact energy absorbing mechanism. The mechanism has a hollow shell with long, generally flat outer and inner surfaces. FIG. 10A shows the seat before a side impact, and FIG. 10B shows the seat during an impact with a vehicle door interior. The long and flat surfaces offer little resistance to the impact force, and the energy absorbing device collapses readily, resulting in a small reduction in the impact three being transferred to the occupant.

It is against this background and the problems and difficulties associated therewith that the present invention has been developed.

SUMMARY

According to a first aspect of the present invention, there is provided a child safety seat comprising a seat body and first and second side wings depending from the seat body, the first and second side wings each comprising an outwardly facing exterior surface, an impact energy absorbing device depending from at least a part of the exterior surface of the first and second side wings, the impact energy absorbing device comprising a hollow and/or gas, liquid, gel or other energy absorbing material filled shell of deformable material formed by blow moulding, comprising an outwardly facing surface and an inwardly or occupant facing surface, and a plurality of energy absorbing elements in the form of recesses extending into the shell from the inwardly facing surface toward the outwardly facing surface, wherein the impact absorbing system is adapted to absorb impact through a combination of the shell plastically or elastically deforming, cushioning, rupturing, deflating or bursting, and the plurality of energy absorbing elements cooperatively plastically or elastically deforming, cushioning or crushing, as a result of the impact.

In one form, the shell has a thin wall of polymeric material.

In one form, the shell is manufactured from low density polyethylene.

In one form, wherein the plurality of energy absorbing elements are circular.

In one form, wherein the plurality of energy absorbing elements are square.

In one form, wherein the plurality of energy absorbing elements are elongate.

In one form, the shell features apertures so that some of any air in the shell can be released in a controlled fashion as the device is compressed as a result of the impact.

According to a second aspect of the present invention, there is provided an impact energy absorbing device comprising a shell with a pair of opposing surfaces, wherein one of the surfaces comprises at least one energy absorbing element in the form of a recess extending into the shell toward the other surface.

BRIEF DESCRIPTION OF DRAWINGS

Embodiments of the present invention will be discussed with reference to the accompanying drawings wherein.

DESCRIPTION OF EMBODIMENTS

Figure 1:
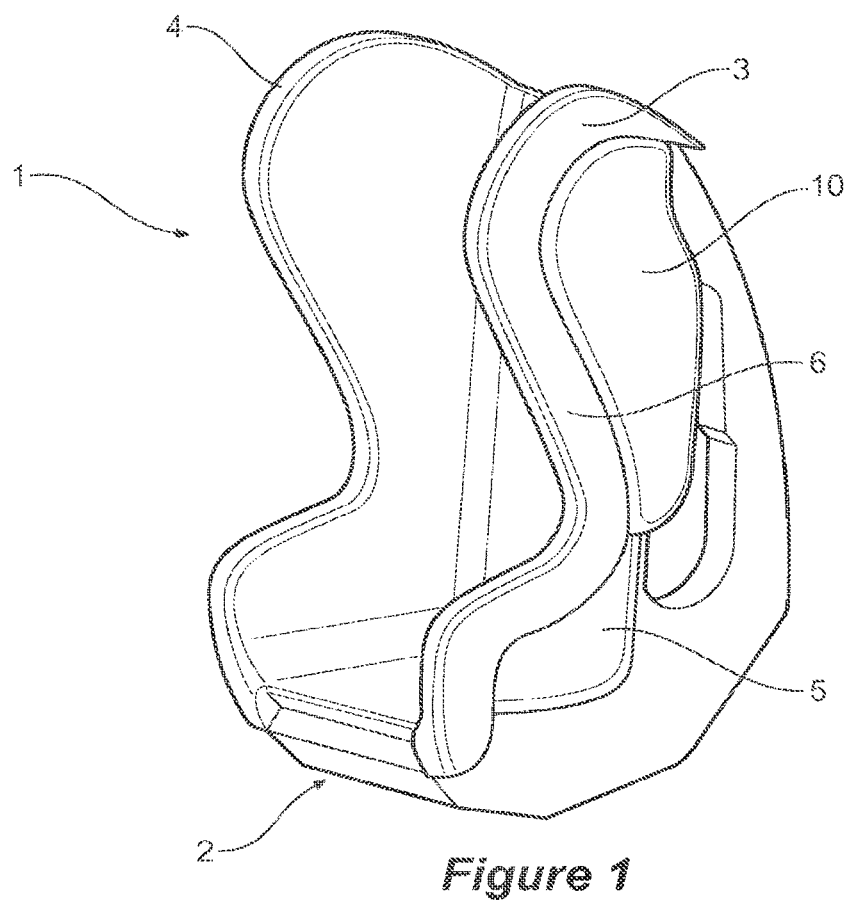
FIG. 1 is a perspective view of a child safety seat.
Figure 2:
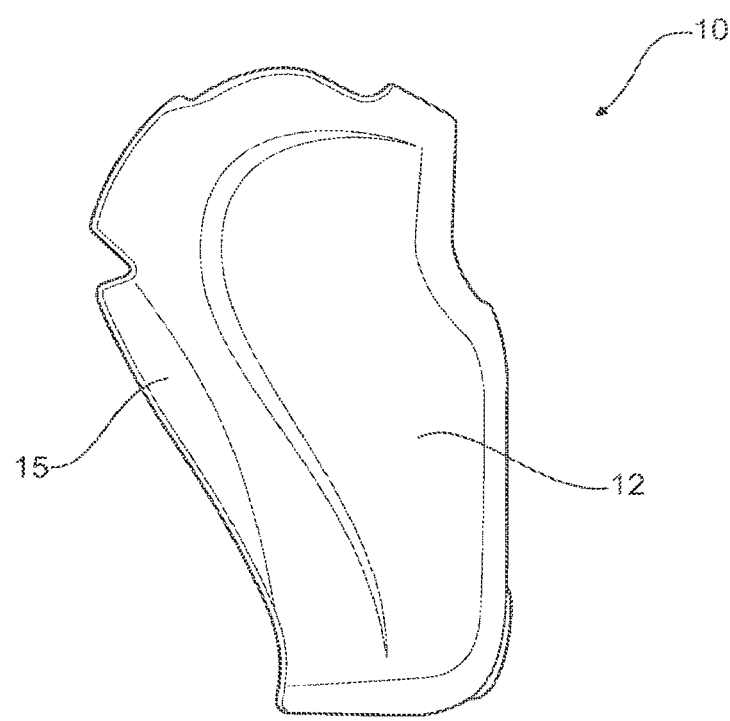
FIG. 2 is a view of an outwardly facing surface of an impact energy absorbing device.
Figure 3:
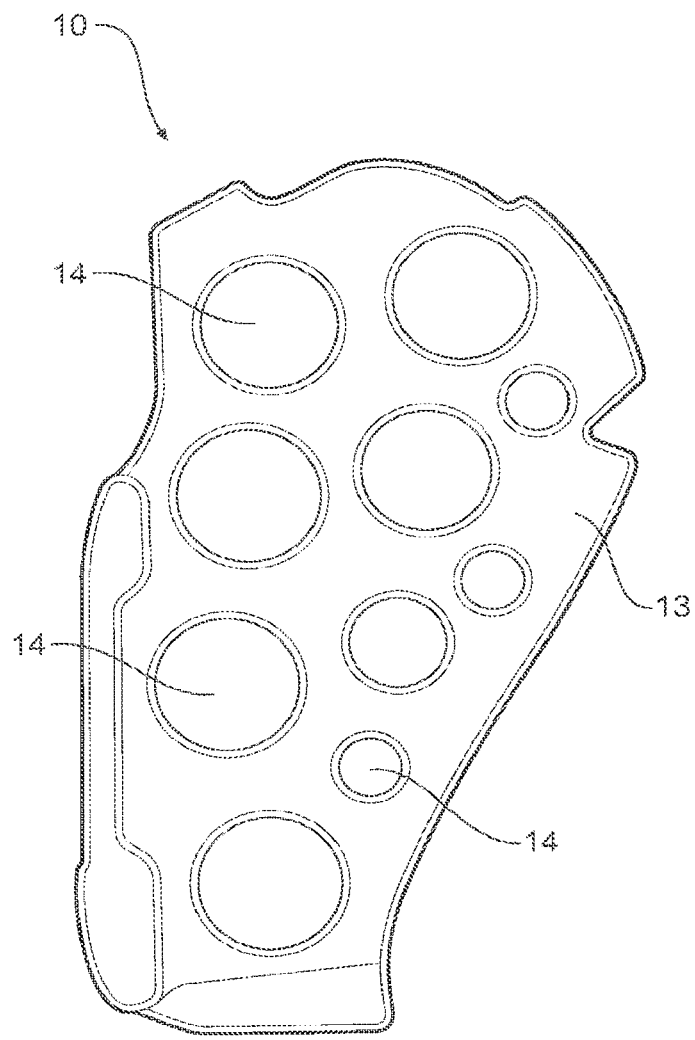
FIG. 3 is a view of the inwardly facing surface of the impact energy absorbing device.
Figure 4:
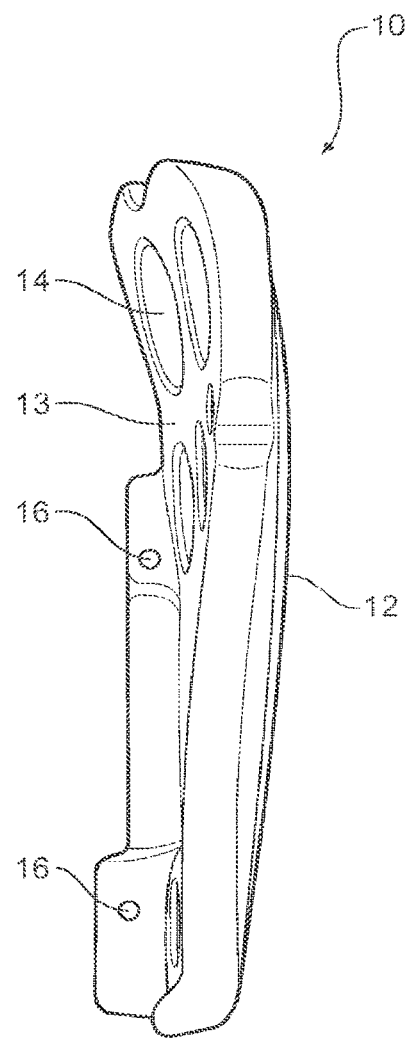
FIG. 4 is a view of a forward edge of the impact energy absorbing device.
Figure 5:
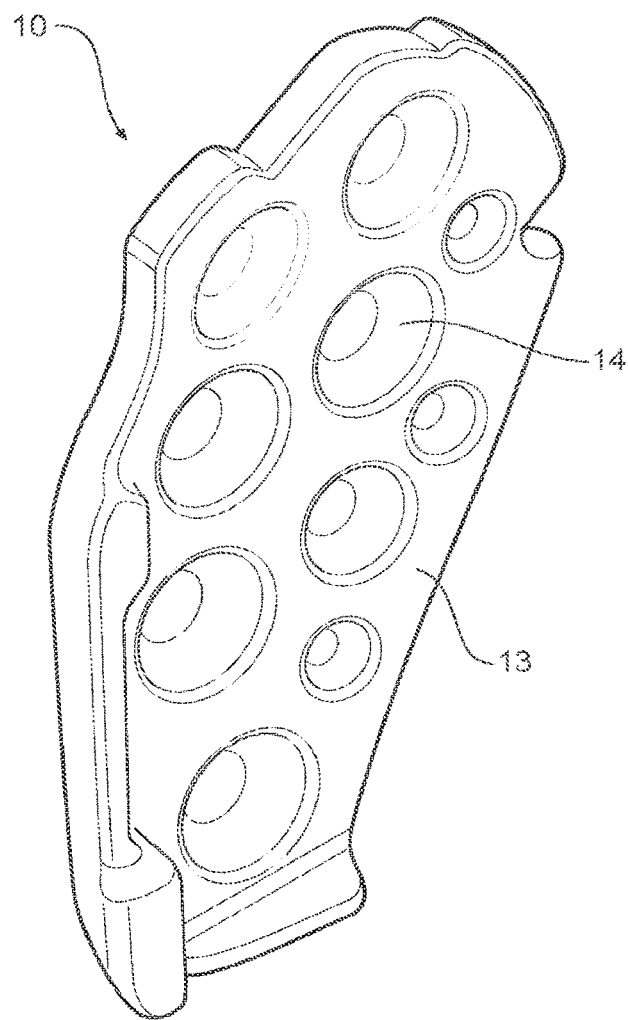
FIG. 5 is a perspective view of the impact energy absorbing device.
Figure 6:
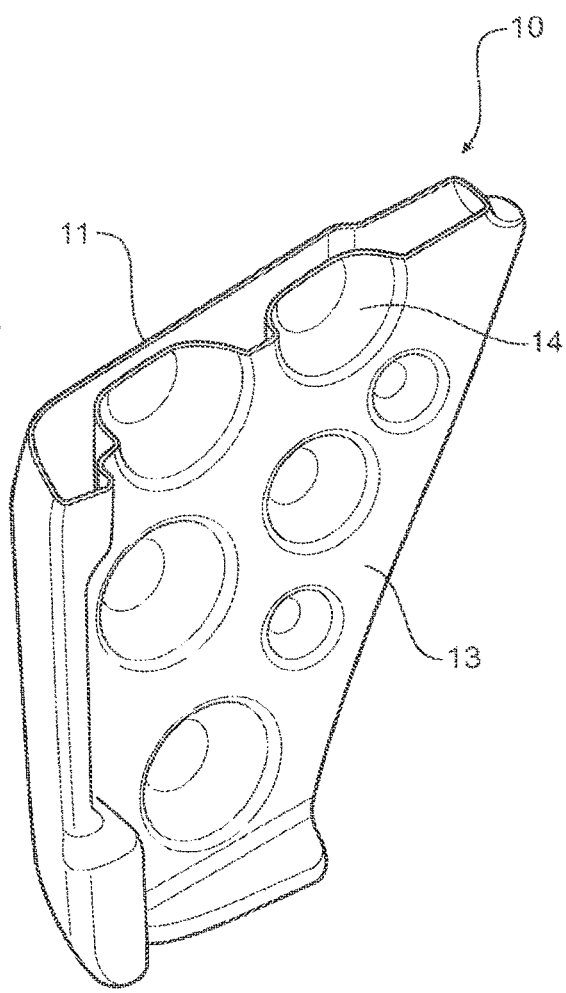
FIG. 6 is a cross-sectional view through the impact energy absorbing device.

Referring now to FIG. 1, them is shown a child safety seat 1 according to an embodiment. The seat 1 comprising a rigid seat body 2 with first and second side wings 3, 4, depending from the seat body 2, the side wings each comprising an outwardly facing exterior surface 5 and an edge defining lip 6. The child safety seat 1 further comprises an impact energy absorbing device 10 depending from the exterior surface 5 of each of the side wings 3, 4.

Referring now to FIGS. 2 to 6, where there is shown the impact energy absorbing device 10, according to an embodiment. The device 10 comprises a shell 11 of deformable material, having an outwardly facing surface 12 and an inwardly or occupant facing surface 13. The device 10 further comprises a plurality of energy absorbing elements 14 in the form of recesses extending into the shell 11 from the inwardly facing surface 13 toward the outwardly facing surface 12.

The shell 11 may be hollow and/or filled with a gas, liquid, gel or other energy absorbing material.

The device 10 may be manufactured by blow moulding, and may be made from a polymer such as low density polyethylene. The device 10 may also be moulded in 2 pieces and then assembled.

The inwardly facing surface 13 of the device 10 is configured to bear against the outwardly facing exterior surface 5 of the side wing 3 and features a portion 15 configured to nest within the edge defining lip 6 of the side wing 3. The device 10 is preferably attached to the side wing 3 by means of screws applied via attachment holes 16. Attachment means need not be so limited, and may be by any suitable means, such as by fixed attachment means such as adhesives or none-way bolts, or by removable attachment means such as screws, clips, slide mounts or the like.

The impact energy absorbing device 10 is adapted to absorb impact force through a combination of the shell 11 plastically or elastically deforming, cushioning, rupturing, deflating or bursting, and the plurality of energy absorbing elements 14 cooperatively plastically or elastically deforming, as a result of the impact.

As can be seen in this embodiment, the energy absorbing elements 14 have a dome shape, which when subjected to a force, will resolve the force into compressive stresses along the walls of the dome, and will push outwardly at the base.

In this embodiment, the energy absorbing elements vary in size and shape and have different depths. The larger diameter, deeper elements would deform more readily, whereas the smaller diameter, shallower elements would provide greater resistance to deformation. Similarly to the concept of a bridge with many arches, the plurality of dome shaped energy absorbing elements will support their adjacent dome shaped support elements.

The impact energy absorbing device 10 may feature one or more apertures (not shown) in the shell 11, such that in the event of an impact force, fluid (particularly gas) inside the shell can be controllably released as the device 10 is compressed by the impact, such that the shell controllably deflates. Alternatively, the device 10 may feature one or more valves (not shown) in the shell 11, such that in the event of an impact force, release of fluid can be precisely controlled such that the valve sacrificially ruptures upon a specific internal pressure being reached when the device 10 is compressed. Alternatively, if the shell 11 does not feature apertures or valving, it may be configured to burst upon impact.

Figure 7A:
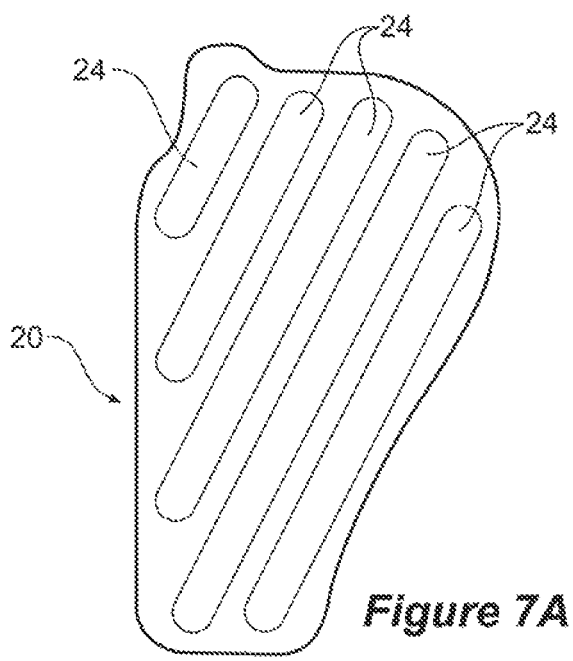
FIG. 7A is a schematic of an alternate embodiment of the impact energy absorbing device.
Figure 7B:
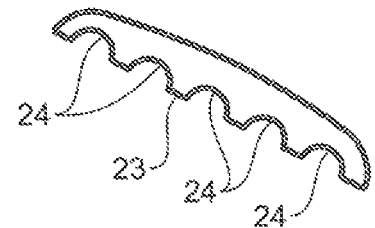
FIG. 7B is a cross-sectional view of the device of FIG. 7A.

Referring now to FIGS. 7A and 7B, where there is shown an impact energy absorbing device 20, according to an alternate embodiment, wherein the energy absorbing elements 24 are elongate and arranged in a parallel fashion.

Figure 8A:
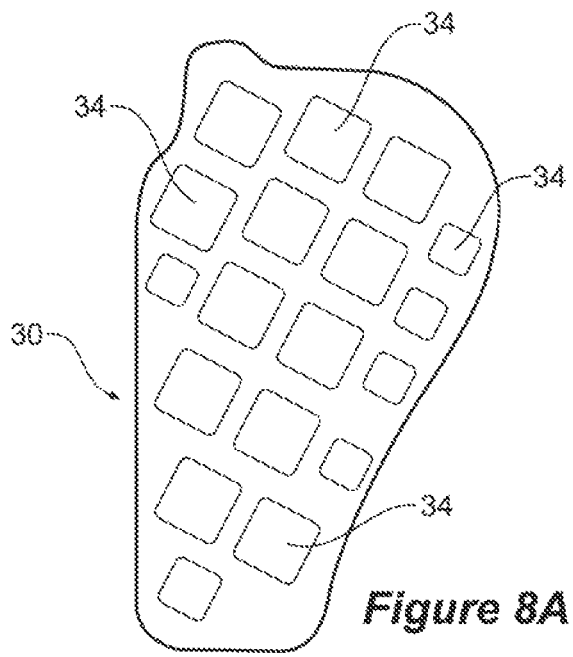
FIG. 8A is a schematic of a further alternate embodiment of the impact energy absorbing device.
Figure 8B:
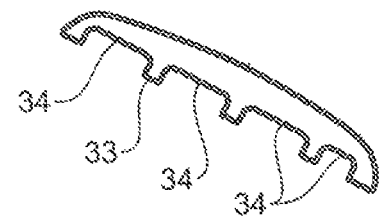
FIG. 8B is a cross-sectional view of the device of FIG. 8A.

Referring now to FIGS. 8A and 8B, where there is shown an impact energy absorbing device 30, according to an alternate embodiment, wherein the energy absorbing elements 34 have a square form.

Figure 9A:
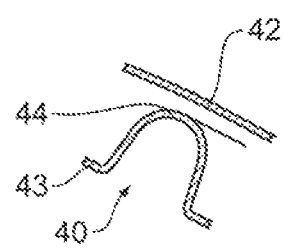
FIG. 9A is a cross-sectional view of a portion of an impact energy absorbing device, according to an embodiment.
Figure 9B:
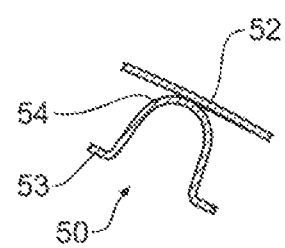
FIG. 9B is a cross-sectional view of a portion of an impact energy absorbing device, according to an embodiment.

Referring now to FIGS. 9A and 9B, where there are shown alternate embodiments of an impact energy absorbing device 40, 50, where the device 40 shown in FIG. 9A features a gap between the outwardly facing surface 42 and the energy absorbing elements 44. In alternative embodiments, such as that shown in FIG. 9B, there may be no gap between the outwardly facing surface 52 and the energy absorbing elements 54.

It will be appreciated many factors will have an effect on the energy absorbing properties of the impact energy absorbing device. As will be appreciated from the embodiments described, the form, size and depth of the energy absorbing elements may vary. The percentage of surface area covered by the elements may also vary. The arrangement or pattern of the energy absorbing elements may also vary. As seen in the FIG. 3, larger elements may be used, with smaller elements being placed interstitially in the spaces between them.

Figure 10A:
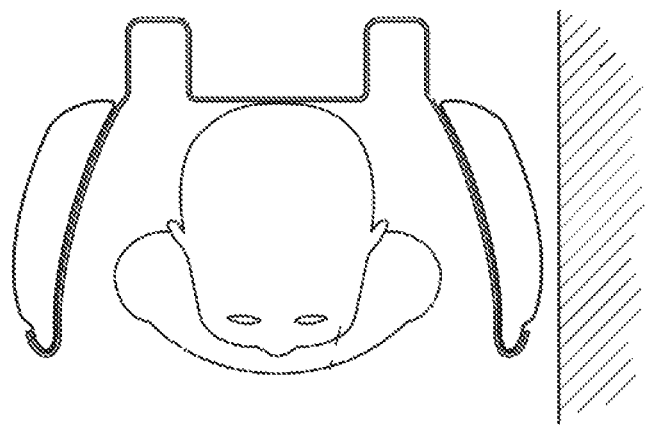
FIG. 10A is a schematic of an existing child safety seat prior to a side impact.
Figure 10B:
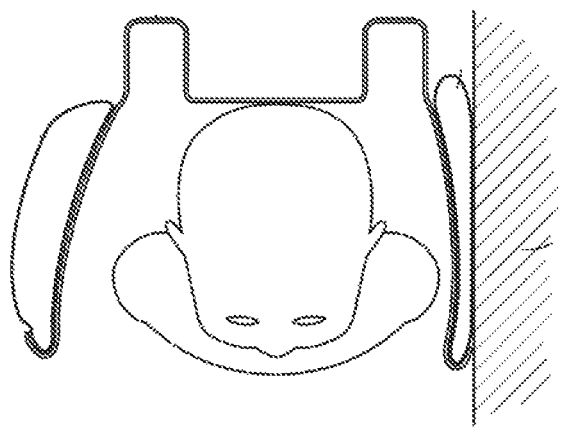
FIG. 10B is a schematic of an existing child safety seat during a side impact.
Figure 10C:
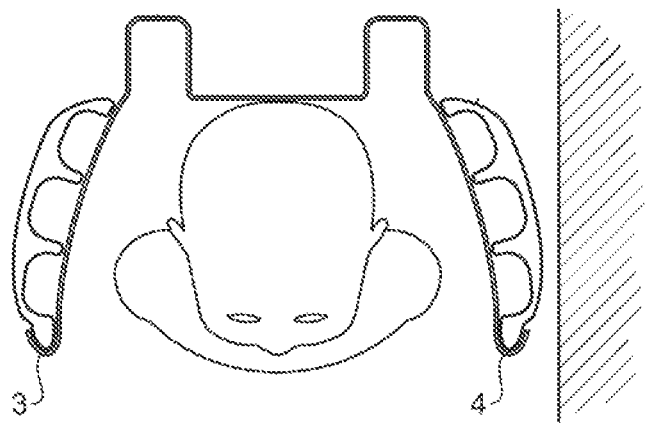
FIG. 10C is a schematic of a child safety seat incorporating an impact energy absorbing device, according to an embodiment, prior to a side impact.

Referring now to FIG. 10C, where there is shown a schematic of the child safety seat 1 incorporating the impact energy absorbing device 10 as shown in FIGS. 1 to 6, prior to a side impact. As will be appreciated, when compared to the existing solution as shown in FIGS. 10A and 10B, the plurality of impact energy absorbing elements 14 which extend between the inwardly facing surface 13 and the outwardly facing surface 12, offer an increased resistance to a side impact force, resulting in a larger reduction in the impact force being transferred to the occupant.

FIGS. 11A to 11E show cross-sectional schematics of a portion of an impact energy absorbing device 60 secured to a side wing 3, before, during and after impact, for the purpose of demonstrating how the device 60 absorbs impact energy.

Figure 11A:
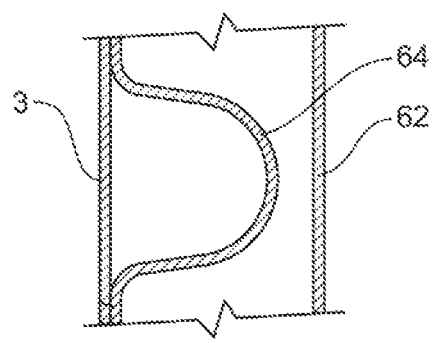
FIG. 11A is a cross-sectional view of a portion of an impact energy absorbing device prior to impact.

FIG. 11A shows the device 60 prior to impact, where it can be seen that the outwardly facing surface 62 is generally planar and a gap exists between the outer surface 62 and the energy absorbing element 64.

Figure 11B:
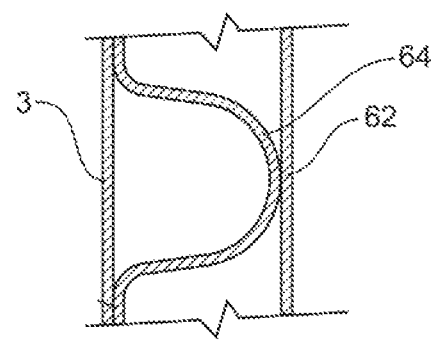
FIG. 11B is a cross-sectional view of a portion of an impact energy absorbing device during impact, where the outer surface of the device is flexing.

FIG. 11B shows the device 60 during impact, where an impact force has been applied to the outwardly facing surface 62 of the device 64. It can be seen that the outer surface 62 has deformed such that there is no longer a gap between the outer surface 62 and the energy absorbing element 64.

Figure 11C:
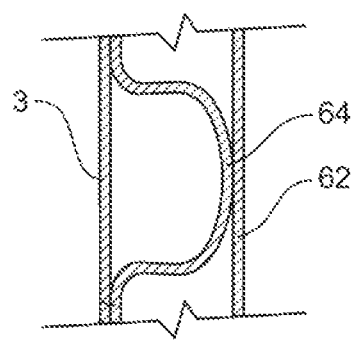
FIG. 11C is a cross-sectional view of a portion of an impact energy absorbing device during impact, where the impact energy absorbing elements are undergoing initial deformation.

FIG. 11C shows the device 60 during impact, where the outwardly facing surface 62 has now further deformed and has transferred a portion of the impact force to the energy absorbing element 64, and the tip of the element 64 has partially deformed to conform to the profile of the outer surface 62 as a result of the force being applied via the surface 62.

Figure 11D:
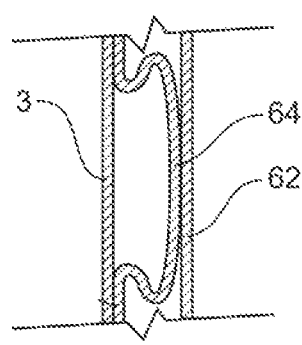
FIG. 11D is a cross-sectional view of a portion of an impact energy absorbing device during impact, where the impact energy absorbing elements have collapsed.

FIG. 11D shows the device 60 during impact, where the outer surface 62 has again further deformed resulting in the energy absorbing element 64 further deforming as a result of the impact force applied via the outer surface 62. Deformation of the element 64 has occurred in the form of the side wall of the element 64 buckling.

Figure 11E:
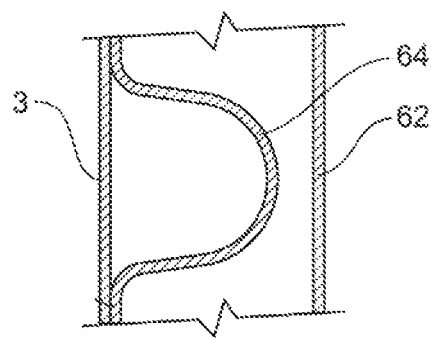
FIG. 11E is a cross-sectional view of a portion of an impact energy absorbing device after impact, where the impact energy absorbing elements and the outer surface of the device have sprung back to their initial state.

FIG. 11E shows the device 60 after impact, where the energy absorbing element 64 and the outwardly facing surface 62 have sprung back to their initial state.

In alternative embodiments, the energy absorbing elements 64 and the outwardly facing surface 62 may plastically deform, and not return to their initial state after impact.

It will be appreciated that a complete impact energy absorbing device comprises a plurality of energy absorbing elements, and that during impact when the outer surface of the device collapses toward the elements, the elements will work as an array or series of impact absorbing elements, to collectively deform under the force of the impact, resulting in the energy absorbing device collapsing over a longer period of time. The amount of impact energy then transferred to the occupant of the restraint is reduced compared to a 'standard' air cushion with generally flat front and back surfaces.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. An impact energy absorbing device for a child safety seat comprising:
a shell enclosing an interior cavity, the shell comprising a first surface opposite a second surface, wherein a plurality of energy absorbing portions of the first surface are recessed such that each portion extends towards the second surface, wherein the interior cavity of the shell is empty or contains a gas, liquid, gel, or foam material, and wherein the shell is configured to absorb energy in response to plastically deforming, cushioning, crushing, rupturing, deflating or bursting as a result of an impact to the shell.

2. The impact energy absorbing device of claim 1, wherein each energy absorbing portion has a dome shape.

3. The impact energy absorbing device of claim 2, wherein each energy absorbing portion has a first width adjacent a non-recessed portion of the first surface and a second width, wherein the first width is greater than the second width.

4. The impact energy absorbing device of claim 3, wherein a first energy absorbing portion has a first outer width and a second energy absorbing portion has a second outer width different than the first outer width.

5. The impact energy absorbing device of claim 3, wherein each energy absorbing portion is configured such that an impact to the shell causes the inner width of at least one energy absorbing portion to increase.

6. The impact energy absorbing device of claim 5, wherein the inner width increases to be greater than the outer width.

7. The impact energy absorbing device of claim 1, wherein each energy absorbing portion has an elongate shape.

8. The impact energy absorbing device of claim 7, wherein each of the energy absorbing portions are parallel with one another.

9. The impact energy absorbing device of claim 1, wherein each energy absorbing portion has a square shape.

10. The impact energy absorbing device of claim 1, wherein each energy absorbing portion extends a respective depth towards the second surface, wherein a first energy absorbing portion extends a first depth, and wherein a second energy absorbing portion extends a second depth different than the first depth.

11. The impact energy absorbing device of claim 1, wherein each energy absorbing portion extends a respective depth towards the second surface, and wherein each energy absorbing portion is configured such that an impact to the shell causes the respective depth of at least one energy absorbing portion to decrease.

12. The impact energy absorbing device of claim 1, wherein there is a gap between at least one energy absorbing portion and the second surface.

13. The impact energy absorbing device of claim 1, wherein at least one energy absorbing portion is in contact with the second surface.

14. The impact energy absorbing device of claim 1, wherein each energy absorbing portion is configured such that a force applied to a part of the energy absorbing portion nearest the second surface is resolved into compressive stresses within the energy absorbing recess.

15. The impact energy absorbing device of claim 1, wherein the shell includes an aperture such that a fluid can be controllably released from the interior cavity upon an impact to the shell.

16. The impact energy absorbing device of claim 1, wherein the shell includes a valve such that a fluid can be controllably released from the interior cavity upon an impact to the shell, wherein the valve is configured to rupture upon a predetermined pressure being reached within the interior cavity.

17. The impact energy absorbing device of claim 1, wherein the shell is constructed of a plastic.

18. The impact energy absorbing device of claim 17, wherein the shell is constructed of low density polyethylene.

19. The impact energy absorbing device of claim 1, wherein the shell is configured to absorb impact energy as a result of an impact to the second surface of the shell when the first surface of the shell is positioned against another surface.

20. The impact energy absorbing device of claim 1, wherein the shell plastically deforming, cushioning, crushing, rupturing, deflating or bursting includes the plurality of energy absorbing portions plastically deforming.

* * * * *